Sept. 12, 1939.　　　A. L. JOHNSON　　　2,172,793
CONTROL MECHANISM
Filed May 16, 1938
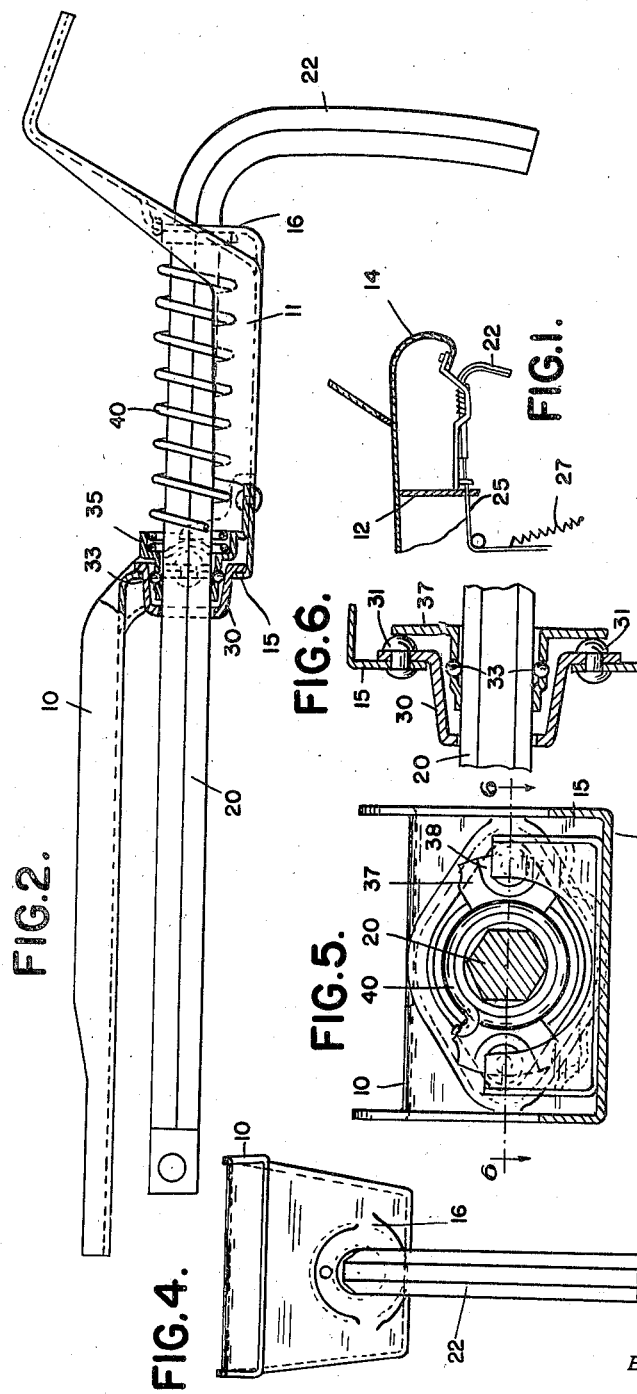
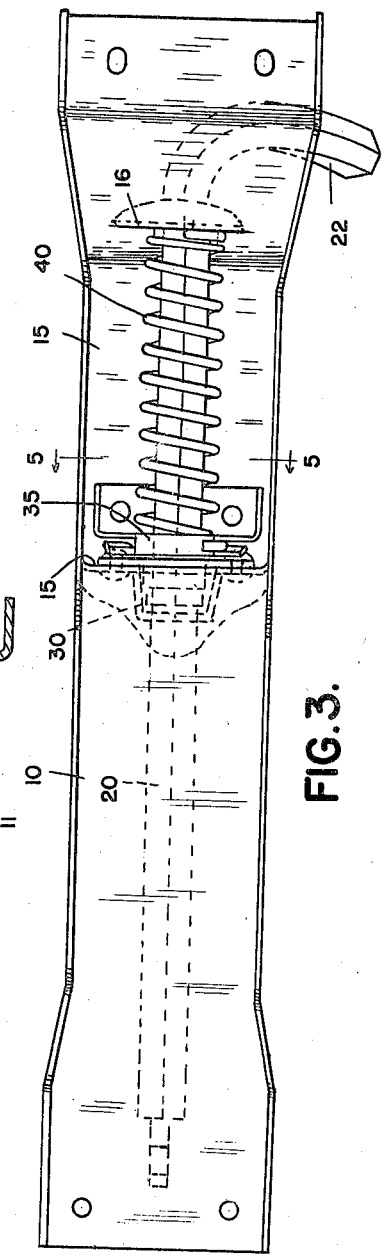
INVENTOR
ANDREW L. JOHNSON
BY
ATTORNEYS Patented Sept. 12, 1939

2,172,793

UNITED STATES PATENT OFFICE 2,172,793

CONTROL MECHANISM

Andrew L. Johnson, Pontiac, Mich., assignor to The American Forging & Socket Company, Pontiac, Mich., a corporation of Michigan Application May 16, 1938, Serial No. 208,134

6 Claims. (Cl. 74—503)

This invention relates to handle-operated control mechanisms for the actuation of manually operable apparatus of almost any character; being particularly adapted, however, for controlling the hand brakes of a motor vehicle. An important object of the invention is to provide such a control mechanism having a handle with a reciprocating motion, adapted to be mounted on the instrument panel of a motor vehicle, and which provides a construction of neat and attractive appearance, adapted to be mounted in a more readily and quickly accessible position than is possible with lever-type and other conventional constructions.

Another object is to provide such a construction of simple and inexpensive nature, which is nevertheless of great strength, smooth in operation, easy to set and easily releasable, no matter how hard the brakes or other controlled apparatus may be set, without requiring great strength on the part of the operator.

Another object is to provide such a device which allows setting the controlled brakes or other apparatus in an infinite number of positions of adjustment, and holding the same in any such position in a very positive manner despite the above noted easy releasability.

Another object is to provide such a device in which the operating handle and a part of the holding mechanism are formed of a simple hexagonal bar, of a type purchasable on the open market and which requires very little forming, machining or other special treatment.

A further object is to provide such a controlling device having holding means operating on the roller clutch principle, such clutch means being of extremely simple and inexpensive construction, compact, instantly releasable by simply turning the operating handle, and at all times and regardless of the position of the handle, held, together with all operating parts, against rattling.

Other objects and advantages will be apparent from the following description, wherein reference is made to the accompanying drawings illustrating a preferred embodiment of my invention and wherein similar reference numerals designate similar parts throughout the several views.

In the drawing:

Figure 1 is a fragmentary and somewhat diagrammatic vertical sectional view through the cowl, instrument panel and other adjacent portions of a motor vehicle, showing one of my improved control devices mounted therein.

Figure 2 is an enlarged view of the control device, partly in side elevation and partly in substantially central section.

Figure 3 is a plan view of the mechanism;
Figure 4 is an end elevation thereof; and
Figures 5 and 6 are vertical sectional views, taken respectively on the lines 5—5 and 6—6 of Figure 3, and looking in the direction of the arrows, Figure 6 showing the clutch means in released position.

Referring now to the drawing, reference character 10 designates the supporting frame or bracket of the device, which is adapted to be attached at its front end to the dash panel 12 of a vehicle, and at its rear extremity to the instrument panel 14. As shown in Figures 2 and 3, the frame is somewhat channeled and provided in a convenient position adapted to be located beneath the instrument panel when the device is installed, with a dropped central portion 11 which supports the mechanism. Such central portion is defined by substantially vertical front and rear walls 15, 16, in which the handle bar 20 is slidable.

At its free end which project toward the rear of the car and is located in a conveniently accessible position beneath the instrument panel, the bar is bent downwardly as at 22 to form a suitably shaped hand grip portion. At its other end the bar is adapted to be connected as by means of the cable 25 with the brakes or other mechanism (unshown) to be operated. Some such spring means as is indicated at 27 is preferably provided tending to return the handle to the in-pressed position in which the rod or bar is slid forwardly of the vehicle as far as possible, or the brake springs may serve this function.

The handle bar is both slidable and rotatable in the supporting bracket, a bearing therefor in the wall 15 being provided by a cupped, sheet metal element 30 riveted to the bracket wall and tapered to act as a wedging abutment for the clutch balls 33. The clutch balls are caged in a cage member 35, slidable longitudinally on the bar but of corresponding shape, so as to be keyed to turn therewith. Wing-like projections 37 extend laterally from the cage 35 and overlie the rounded heads of the rivets 31 by which cup member 30 is attached to bracket wall 15. The wings 37 are also centrally embossed as at 38 in the areas which overlie the rivets. A compression spring 40 encircling the bar and trapped between the cage 35 and the wall 16 urges the cage into the cup 30 and the balls 33 toward the wedged position in which they are jammed between the bar and cup. The spring means 27 positively maintains such jammed condition, which will be seen to prevent return movement of the handle bar after it has been pulled out to any desired position. When the bar is rotated about its longitudinal axis, however, the cage 35 is turned therewith, forcing the sides of the embossed areas 38 of wings 37 to engage and ride upwardly on the rivet heads 31, forcing the cage out of the cup and freeing the balls from the wedged position. Since the rod is freely slidable in the cage except for the wedging action of the balls, it is then movable inwardly to any desired extent, so long as it is held at such angle that the cage is thus cammed outwardly far enough to free the balls from their clutching action. When the handle is released, the camming action of the embossed sections 38, because of the longitudinal effort of spring 40 which urges the cage into the cup, tends to center the handle portion 22 in and return it to the vertical position in which the clutch is engaged. Since the clutch balls and other parts are always engaged under spring tension when the handle is released, it will be seen that lost motion and rattling are impossible and the clutch always stands in the engaged position.

What I claim is:

1. Operating means comprising in combination with a support, a polygonal rod slidable and rotatable in the support, spring means tending to urge the bar in one direction, and clutch means for preventing unwanted movement of the bar in the direction in which it is urged by such spring means, comprising a tapered clutch element encircling the bar, a roller cage slidably mounted on the bar but held against unwanted rotation with relation to the bar, roller means caged by said cage and movable therewith into and out of a position in which such roller means is wedged between the bar and the tapered clutch element, spring means urging the cage into the position in which the roller means is wedged, and camming means responsive to rotation of the bar for moving the cage out of such wedged position.

2. Control means comprising in combination with a support, a rod slidable and rotatable in the support, and clutch means for preventing unwanted movement of the rod in one direction, comprising a tapered clutch element encircling the bar, a roller cage slidable but held against rotation with respect to the bar, roller means positioned by said cage and slidable therewith into and out of a position in which said roller means is wedged between the bar and the tapered clutch element, spring means urging the cage into the position in which the roller means is wedged, and camming means operative in response to rotation of the bar to move the cage out of such wedged position.

3. Control means as set forth in claim 2 in which said spring means also urges said camming means toward inoperative position.

4. Control means as set forth in claim 2 in which said support includes a pair of spaced walls in which said rod is slidable and rotatable, said tapered clutch element being carried by one of said walls, and its larger side being openly accessible from the space between said walls, said cage being mounted on the shaft between said walls, and the camming means including a portion carried by the support and acting to urge the cage out of the clutch element when the cage is rotated by rotation of the rod.

5. Control means as set forth in claim 2 in which said support includes a pair of spaced walls in which said rod is slidable and rotatable, said tapered clutch element being carried by one of said walls and facing inwardly toward the space between the walls, said cage being mounted on the rod between the walls, said camming means comprising a laterally projecting portion carried by the cage, a cooperating portion carried by the support and engageable by said camming portion to urge the cage outwardly of the clutch element in response to rotation of the cage effected by rotating the rod, said spring means also being mounted on the rod between said walls and acting to urge the cage and the camming portion carried thereby toward clutched position.

6. Control means as set forth in claim 2 in which said support includes a pair of spaced walls in which said rod is slidable and rotatable, said tapered clutch element comprising a cupped member carried by one of said walls and facing inwardly toward the space between the walls, said cage comprising a sheet metal element mounted on the rod between the walls and slidable into said cupped member, said cage having a laterally extending portion overlying one of said walls, said camming means comprising cooperating projecting and depressed portions carried by the wall and the cage respectively and adapted to interfit when the cage is in the wedged position, said projecting and depressed portions having inclined walls whereby when the cage is rotated by rotation of the shaft they act to urge the cage outwardly of the cupped member, said spring means also being carried by said rod between said walls and urging said cage into the cupped member and the projecting and depressed portions into interfitted relation, said projecting and depressed portions also acting to tend to turn the cage to a position allowing the same to return to wedged position.

ANDREW L. JOHNSON.